Jan. 4, 1938.  C. O. BOWERS ET AL  2,104,702

BRAKE MECHANISM

Filed Dec. 21, 1936

INVENTOR.
Charles O. Bowers
Andrew C. Williams
BY
ATTORNEY.

Patented Jan. 4, 1938

2,104,702

UNITED STATES PATENT OFFICE 2,104,702

BRAKE MECHANISM

Charles O. Bowers and Andrew C. Williams, Lansing, Mich., assignors of one-third to Samuel H. Davis, Lansing, Mich.

Application December 21, 1936, Serial No. 117,090

6 Claims. (Cl. 188—78)

This invention relates generally to vehicle braking mechanisms and particularly to such mechanisms of the self-acting type for use in connection with motor driven vehicles.

An object of the invention is to provide a braking mechanism of the self-acting type which, upon being initially energized, will multiply the direct braking power applied thereto.

Another object of the invention is to provide a braking mechanism including a frictional brake band which, upon being initially engaged with a rotating brake drum, will additionally expand to increase the frictional engagement.

A further object of the invention is to provide an adjustable lost motion connection between the brake actuating means and the brake band to permit additional frictional engagement of the brake band with the drum and to permit relative movement between the actuating means and the brake band after initial frictional engagement of the band with the brake drum has taken place.

Another object of the invention is to provide actuating mechanism which will require a minimum amount of power to effect initial application of the brake.

Figure 1:
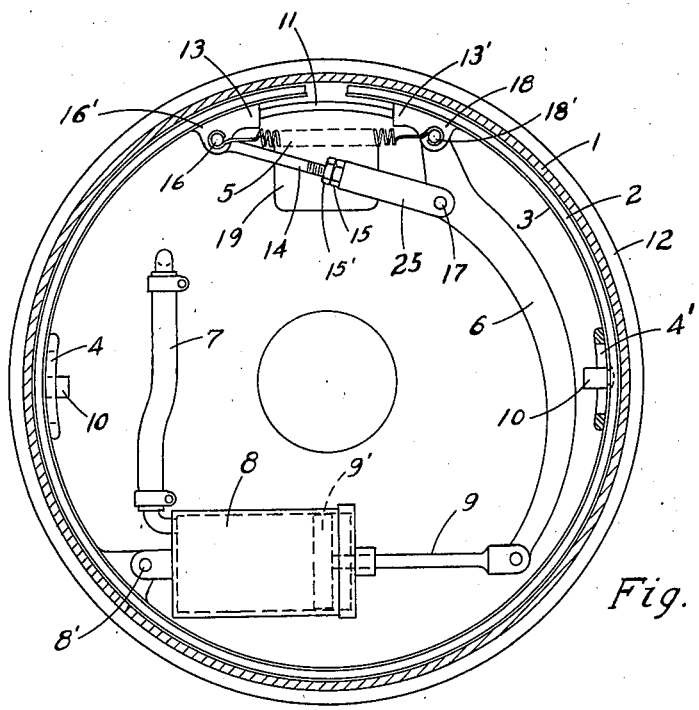
Figure 2:
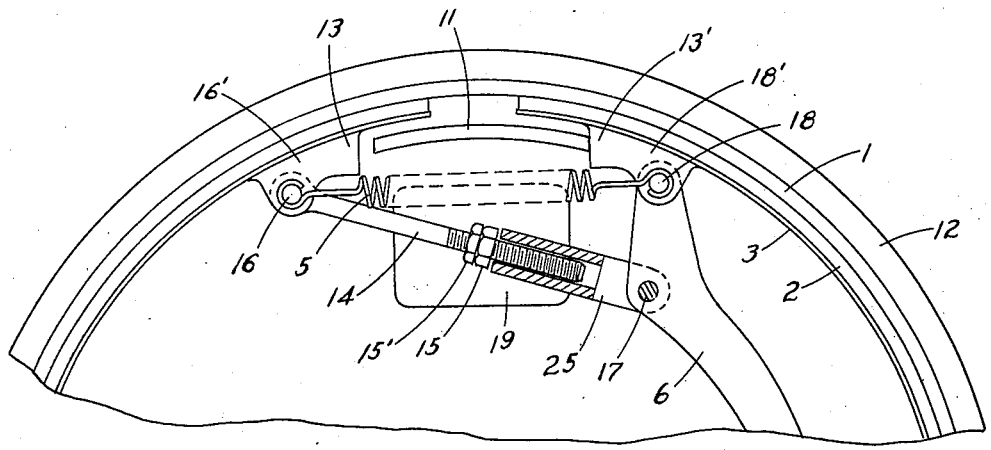

Other objects and advantages of the invention will become apparent from a reading of the following description taken in connection with the accompanying drawing in which, Fig. 1 is a sectional view taken through a braking mechanism embodying the present invention, and Fig. 2 is a fragmentary sectional view similar to that of Fig. 1 but more clearly illustrating the related parts.

With reference to the drawing, the usual internal type brake drum 1 encircles a frictional brake band 3 which is mounted upon a fixed backing plate 12 having an inspection opening 19 therein. Brake band guides 4 are secured at right angles to the backing plate 12 and are each provided with a slot 4' formed therein to receive positioning pins 10 extending radially inwardly from the brake band 3 to permit a limited circular and radial movement of the brake band relative to the guides 4.

The brake band 3 comprises a single circular strip of spring metal or other strong resilient material having adjacent free, separable ends and is provided on its outer periphery with a suitable friction material 2. Extending radially inwardly adjacent its separable free ends, the band 3 is provided with stops 13 and 13' which may be of any desired shape and are adapted to abut an anchor 11 on the backing plate to limit the circular travel of the brake band.

The mechanism for initially causing actuation of the brake band to frictionally engage the brake lining 2 with the brake drum 1 comprises in the present instance a vacuum cylinder 8 pivotally secured to the brake band 3 as at 8' and provided with a reciprocable piston 9' having a piston rod 9 secured thereto which extends through an end of the cylinder 8 and is pivotally secured to the lower free end of a brake operating lever 6. It will be observed that the cylinder 8 is positioned substantially diametrically opposite the free ends of the brake band 3, the purpose of which will later appear. Vacuum may be applied to the interior of the cylinder 8 through a flexible hose connection 7 extending through the backing plate 12 and connected by any suitable means, not shown, to a suitable source of vacuum. It will be apparent that other well-known operating mechanisms may be used in place of the special form of hydraulic means provided by the vacuum-operated piston which we have used illustratively.

The mechanism for directly actuating the brake band 3 in response to the power produced by the vacuum piston and cylinder, comprises the relatively long lever 6 pivoted to the piston rod 9 and extending across drum 1 to one free end of the brake band 3 where it is pivotally secured to a lug 18' formed thereon as at 18. The lever 6 is placed to one side of the center of the brake and may be curved to follow generally the shape of the drum. The comparatively long length of lever 6 is due to the positioning of the cylinder 8 as far as possible from the ends of the brake band making necessary only a minimum amount of power for the effective application of the brake. A linkage mechanism is pivotally connected to the lever 6 as at 17 and extends to the opposite free end of the brake band 3 where it is pivotally secured to a lug 16' formed thereon as at 16, and a retracting tension spring 5 of any suitable form is secured at any convenient points, here shown to the pivot pins 16—18, and extends between the separable, free ends of the brake band 3 for returning the brake band to its original retracted position.

It will be seen from the description thus far, assuming the brake drum to be rotating counter-clockwise or to the left in Figs. 1 and 2, that upon initial frictional engagement of the left end of the brake band with the rotating drum, a portion of the band will tend to move counter-clockwise with the drum, or to the left. Such movement immediately causes lug 13' on the opposite or right free end of the brake band 3 to engage the anchor 11, thus preventing the band from further circular movement and causing it to expand radially, increasing the frictional engagement thereof with the drum.

It is necessary, however, that a lost motion connection be interposed in the linkage whereby this circular movement and radial expansion of the brake band may be possible to the fullest extent. To this end a sleeve 25 is suitably pivotally secured to the lever 6 as at 17 and extends toward the free end of the brake band 3 opposite the lever 6, and a rod 14 pivotally secured at one end to the lug 16', is positioned with the sleeve 25 in telescopic relation thereto for relative, reciprocal movement. The rod 14 is threaded and provided with an adjusting nut 15 engaging the open end of the sleeve 25 to vary the telescopic relation of the sleeve 25 and the rod 14. The rod 14 is also provided with a lock nut 15' which engages the adjusting nut 15 to lock the same in position.

From the above described construction it will be apparent that movement of the lever 6 and sleeve 25 to the left will also force the rod 14 to the left resulting in initial frictional engagement of the brake band 3 with the rotating drum. As the drum rotates counter-clockwise being held in frictional engagement with an end of the brake band 3, the brake band will move slightly counter-clockwise with the drum forcing lug 13' on the opposite end of the brake band 3 into engagement with the anchor 11. Such movement is possible due to the fact that the rod 14 is carried with the moving brake band 3 and reciprocates within the sleeve 25 to the left resulting in a separation of the nut 15 and the end of the sleeve as shown in Fig. 2. If it were not for this lost motion connection, any additional circular and radial movement of the brake band after primary application thereof would be prevented and the full frictional effect of the brake band would be lost. This connection permits a wrapping action to take place at the free end of the brake band prior to the shifting of the rod 14 and lever 6 linkage to the progressively expanding positions of the brake band ends.

Assuming the brake drum 12 to be rotating to the left, the full operation of the brake is as follows: A vacuum is produced in the cylinder 8 in response to actuation of a suitable control by the operator thereby forcing the piston 9' to the left, thus moving the lever 6 to the left against its fulcrum 18 and moving the sleeve 25 and rod 14 to the left resulting in the frictional engagement of the left free end of the brake band 3 with the rotating drum 12. As soon as the left free end of the brake band is frictionally engaged with the drum, further movement of the lever 6 will force the right free end of the brake band into frictional engagement with the rotating drum. This is due to the fact that the fulcrum of the lever 6 is changed from the point 18 to the point 17. As the brake band 3 moves to the left (Fig. 2) in response to the frictional engagement thereof with the rotating drum, the right free end of the brake band also moves to the left and the lug 13' will engage the anchor 17, thus preventing further circular movement of the band. As the left side of the brake band further moves counter-clockwise, it will expand radially, thus materially increasing the frictional engagement thereof with the drum. The greater the load produced by the drum the greater will be the frictional engagement of the brake band therewith as long as power is applied. As the brake band thus rotates the cylinder 8 and piston 9 also move with the band to maintain the parts in the same relative position. The above described movement of the brake band to the left results in a reciprocal movement of the rod 14 relative to the sleeve 25 separating the adjusting nut 15 from the end of the sleeve. This separation, as shown in Fig. 2, is, however, only momentary because further application of power will move the sleeve 25 further to the left so that it again engages the nut 15 on the rod 14 and the frictional application of the brake band to the drum is maintained. It should also be pointed out that any wrapping effect of the brake band which takes place upon application thereof to the drum is not sufficient to maintain the parts in frictional engagement after the power is released.

As the power is reduced on the end of lever 6, the retracting spring 5 will move the free ends of the brake band together, the parts will resume their original position and the brake will be released.

Assuming the brake drum to be rotating to the right in Figs. 1 and 2, the operation of the device is substantially the same as that above described with the exception that the right free end of the brake band will move with the drum clockwise forcing the lug 13 on the left free end of the band into engagement with the anchor 11, and the sleeve 25 will move to the right relative to the rod 14.

It will thus be seen that first, a relatively long lever is provided whereby a minimum amount of power is necessary to effect initial engagement of the brake band with the drum 12, and secondly, that an adjustable lost motion connection is provided in the linkage between the source of power and the brake band permitting circular movement and radial expansion of the band relative to the linkage and to the backing plate resulting in immediate movement of the brake band into full frictional engagement with the brake drum providing the maximum in braking effect. Moreover, due to the fact that the motor is carried by the brake band, the piston, operating lever and linkage are maintained in the same relative position at all times.

It will be apparent to those skilled in the art that various modifications in construction and design may be made without departing from the spirit or scope of the invention as defined by the appended claims.

What is claimed and desired to be secured by Letters Patent is:

1. In a brake, a fixed support, an anchor on said support, a rotatable brake drum associated with said support, a floating circular friction band mounted on said support and having separable adjacent ends, power actuating means carried by said friction band and positioned substantially diametrically opposite said separable ends, a relatively long lever extending across said drum and pivoted at one end to said band adjacent one end thereof and pivoted at its other end to said actuating means, a sleeve pivoted to said lever adjacent the connection thereof to said band, and a member telescopically engaging said sleeve and pivoted to the other end of said band.

2. In a brake, a fixed support, an anchor on said support, a rotatable brake drum associated with said support, a floating circular friction band mounted on said support and having separable adjacent ends, power actuating means carried by said friction band and positioned substantially diametrically opposite said separable ends, a relatively long lever extending across said drum and pivoted at one end to said band adjacent one end thereof and pivoted at its other end to said actuating means, an adjustable lost motion connection pivoted at one end to said lever adjacent the connection thereof to said band, and pivoted at its opposite end to the other end of said band.

3. In a brake, a fixed support, an anchor on said support, a rotatable brake drum associated with said support, a floating circular friction band mounted on said support and having separable adjacent ends, brake actuating means carried by said friction band and positioned substantially diametrically opposite said separable ends, a relatively long lever extending across said drum and pivoted at one end to said band adjacent one end thereof and pivoted at its other end to said actuating means, a sleeve pivoted to said lever adjacent the connection thereof to said band, a member telescopically engaging said sleeve and pivoted to the other end of said band, and an adjustable shoulder on said member engaging an end of said sleeve.

4. In a brake, a fixed support, an anchor on said support, a rotatable brake drum associated with said support, a floating circular friction band mounted on said support and having separable adjacent ends, power actuating means carried by said friction band and positioned substantially diametrically opposite said separable ends, a relatively long lever extending across said drum, curved to follow the shape of the drum, and pivoted at one end to said band adjacent one end thereof and pivoted at its other end to said actuating means, a sleeve pivoted to said lever adjacent the connection thereof to said band, and a member telescopically engaging said sleeve and pivoted to the other end of said band.

5. In a brake, a fixed support, an anchor on said support, a rotatable brake drum associated with said support, a floating circular friction band mounted on said support and having separable adjacent ends, power actuating means carried by said friction band and positioned substantially diametrically opposite said separable ends, a relatively long lever extending across said drum, curved to follow the shape of the drum, and pivoted at one end to said band adjacent one end thereof and pivoted at its other end to said actuating means, an adjustable lost motion connection pivoted at one end to said lever adjacent the connection thereof to said band, and pivoted at its opposite end to the other end of said band.

6. In a brake, a fixed support, an anchor on said support, a rotatable brake drum associated with said support, a floating circular friction band mounted on said support and having separable adjacent ends, brake actuating means carried by said friction band and positioned substantially diametrically opposite said separable ends, a relatively long lever extending across said drum, curved to follow the shape of the drum, and pivoted at one end to said band adjacent one end thereof and pivoted at its other end to said actuating means, a sleeve pivoted to said lever adjacent the connection thereof to said band, a member telescopically engaging said sleeve and pivoted to the other end of said band, and an adjustable shoulder on said member engaging an end of said sleeve.

CHARLES O. BOWERS.
ANDREW C. WILLIAMS.